US005740548A

United States Patent [19]

Hudgens

[11] Patent Number: 5,740,548

[45] Date of Patent: Apr. 14, 1998

[54] DRIVER SAFETY PARAMETER DISPLAY APPARATUS

[76] Inventor: Larry Mabry Hudgens, P.O. Box 616, 8930 CR 198, Liverpool, Tex. 77577

[21] Appl. No.: 552,735

[22] Filed: Nov. 3, 1995

[51] Int. Cl.$^6$ ............................... B60Q 1/50; G06F 17/40

[52] U.S. Cl. ............................ 701/35; 364/565; 364/569; 340/438; 340/458; 340/463; 368/99; 368/109

[58] Field of Search ....................... 364/424.04, 423.098, 364/550, 561, 565, 569, 431.01; 340/438, 459, 441, 458, 870.01, 461, 436, 815.45; 368/10, 109, 107, 99; 377/20, 16, 24.1

[56] References Cited

U.S. PATENT DOCUMENTS

| | | | |
|---|---|---|---|
| 3,732,539 | 5/1973 | Easterly | 340/466 |
| 3,975,708 | 8/1976 | Lusk et al. | 340/458 |
| 4,081,663 | 3/1978 | Ahlberg | 364/464.27 |
| 4,338,512 | 7/1982 | Ludwig | 377/20 |
| 4,478,521 | 10/1984 | Evans et al. | 268/8 |
| 4,591,823 | 5/1986 | Horvat | 340/936 |
| 4,608,638 | 8/1986 | Tsikos | 364/424.04 |
| 4,612,655 | 9/1986 | Nakamura | 377/16 |
| 4,853,859 | 8/1989 | Morita et al. | 364/424.04 |
| 4,916,827 | 4/1990 | Rayburn | 33/563 |
| 5,017,916 | 5/1991 | Londt et al. | 340/870.13 |
| 5,046,007 | 9/1991 | McCrery et al. | 364/424.04 |
| 5,065,320 | 11/1991 | Hayashi et al. | 364/423.098 |
| 5,222,469 | 6/1993 | Sutton | 123/198 DC |
| 5,253,224 | 10/1993 | Van Doesburg | 368/10 |
| 5,433,296 | 7/1995 | Webberley | 188/1.11 |

*Primary Examiner*—Tan Q. Nguyen

[57] ABSTRACT

A driver safety parameter display apparatus for a motor vehicle includes a housing assembly and a timer assembly for recording time data for time of operation of the motor vehicle. A computer processor assembly is electrically connected to the timer assembly for receiving time data signals from the timer assembly. An array of individual illumination assemblies is supported by the housing assembly and is visible from outside the housing assembly. The illumination assemblies are electrically connected to the computer processor assembly for indicating sequentially and cumulatively an accumulation of time of operation of the motor vehicle. A connector assembly is provided for mechanically connecting the housing assembly to an outside surface of the motor vehicle. The array of illumination assemblies includes nine illumination assemblies arranged in a matrix of three rows and three columns and includes a tenth illumination assembly placed aside the matrix of illumination assemblies. The matrix of nine illumination assemblies indicates a sequence of one to nine driving hours, and the tenth illumination assembly indicates a tenth driving hour. A maximum speed indicator assembly includes a digital speed display module for displaying a maximum speed obtained by the vehicle during a run. A cumulative mileage indicator assembly includes a digital cumulative distance display module for displaying a cumulative mileage obtained by the vehicle during a run. A tamper indication assembly includes a switch assembly actuated by displacement of the housing assembly. The switch assembly, via the computer processor assembly, controls a tamper indication display module.

6 Claims, 2 Drawing Sheets

FIG 1
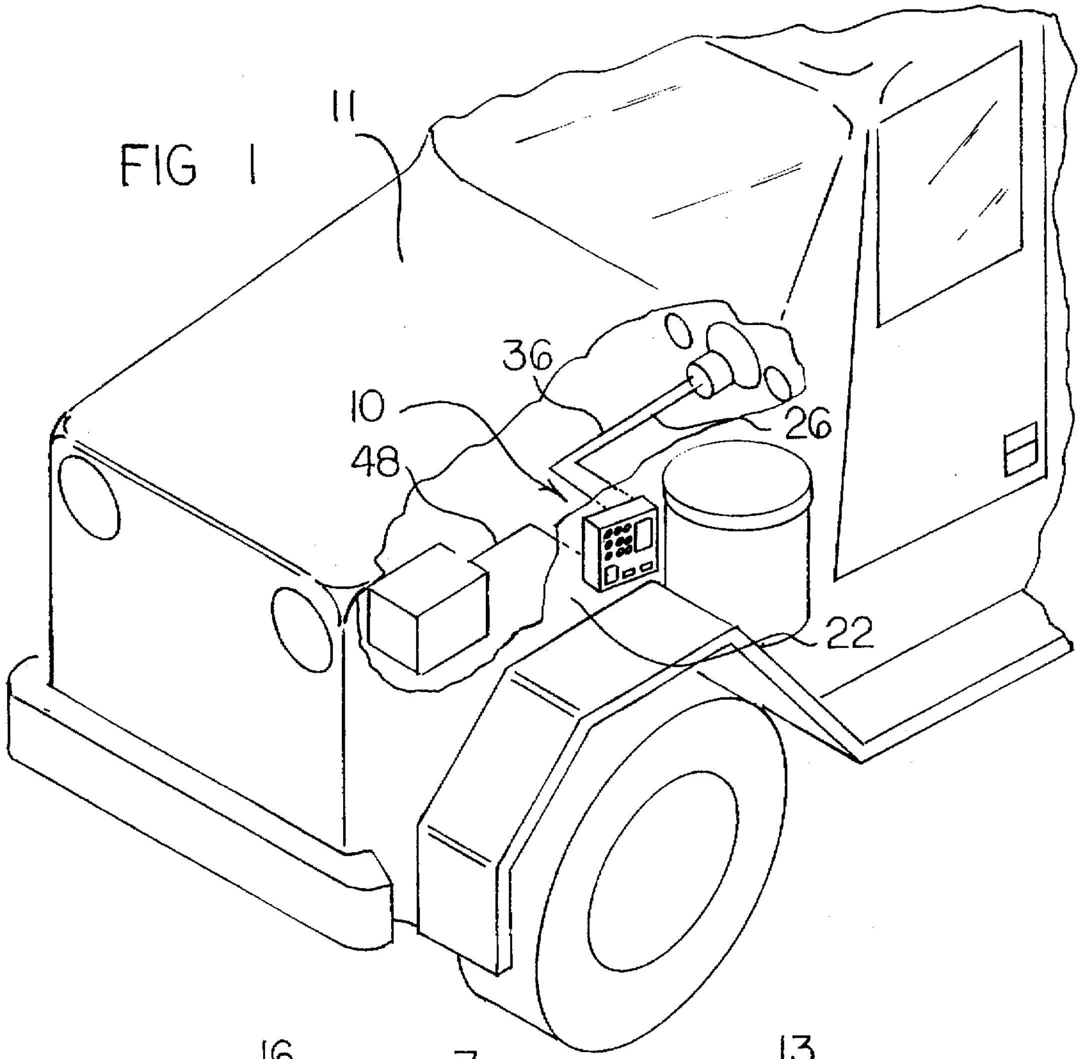
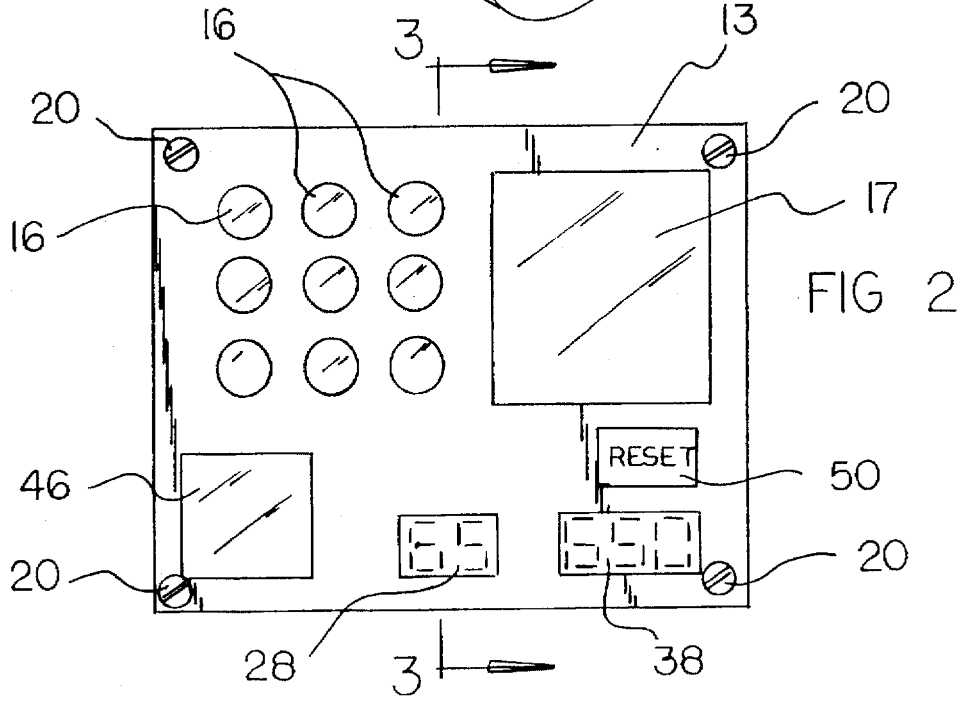
FIG 2

DRIVER SAFETY PARAMETER DISPLAY APPARATUS

BACKGROUND OF THE INVENTION

1. Field of the Invention

The present invention relates generally to devices for recording and displaying time data and, more particularly, to devices especially adapted for recording and displaying time data relating to driver safety.

2. Description of the Prior Art

In general, when drivers drive motor vehicles for extended periods of time, the drivers are subject to fatigue and feeling sleepy. When a driver is in such a state, the driver may not be adequately alert to avoid dangerous road conditions. Moreover, such a driver may have a tendency to fall asleep at the wheel. Safety considerations relating to motor vehicle drivers who are professional drivers are especially important. Such drivers regularly drive for extended periods of time, and it is especially important that such drivers not be subject to fatigue. In fact, there are Federal motor carrier safety regulations that govern the length of time that a driver is permitted to drive without a break, and the safety regulations also cover a minimum amount of off-road time that a driver must have before a resumption of driving.

Throughout the years, a number of innovations have been developed relating to devices for keeping track of driving time, and the following U.S. patents are representative of some of those innovations: U.S. Pat. Nos. 4,338,512; 4,608,638; 4,612,655; 4,916,827; 5,046,007; and 5,253,224.

More specifically, U.S. Pat. No. 4,338,512 discloses a truck safety recorder which provides a digital display of driver time which provides time information to a driver inside the cab of a motor vehicle. The digital display is also viewable to inspectors who look into the cab of the motor vehicle. However, the device in the patent does not permit an observer at any substantial distance away from the motor vehicle to observe the digital display. Moreover, the device disclosed in this patent does not permit an observer outside the motor vehicle from observing the display when the motor vehicle is in motion. That is, a designated officer stationed at a road side location could not observe the digital display in the vehicle. In this regard, for purposes of efficient monitoring of motor vehicles and for purposes of monitoring time data relating to driver safety without requiring the vehicles to stop to be checked, it would be desirable if a driver safety parameter display were provided that can be visually monitored on a moving vehicle and can be monitored without having the vehicle to stop to be checked.

U.S. Pat. No. 4,608,638 discloses an electronic apparatus for accumulating and storing statistical information relating to trips travelled by motor vehicles. With this device, as before, there is no disclosure that the device can be observed by a person outside a vehicle when the vehicle is in motion.

U.S. Pat. No. 4,612,655 discloses a driving time alarm for a vehicle that sounds an audible alarm when the driver has driven a predetermined time. The audible alarm alerts the driver in the vehicle that the predetermined time period has been exceeded. There is no communication to any designated officer outside the moving vehicle.

U.S. Pat. No. 4,916,827 discloses a manually operated device that provides for a driver to manually log in driving time parameters. Because of the possibilities of human error and further possibilities that a driver's manually logged in data may not be trustworthy, it would be desirable if a driver safety parameter display were provided that automatically and electronically records appropriate driving safety parameters without having a driver manually enter the driving data.

U.S. Pat. No. 5,046,007 discloses a motor vehicle data collection device that automatically records data and that displays data within a motor vehicle. With this device, there is no disclosure that the device can be observed by a person outside a vehicle when the vehicle is in motion.

U.S. Pat. No. 5,253,224 discloses a method and electrical system for recording and processing time-related data relating to the operation of motor vehicles. However, with this device, there is no disclosure that the device can be observed by a person outside a vehicle when the vehicle is in motion.

Still other features would be desirable in a driver safety parameter display apparatus. For example, officers who monitor traffic on a roadway are generally stationed on a side of the roadway. Therefore, for a driver safety parameter display apparatus that is to be observed by an officer stationed on a side of the roadway, it would be deskable if the display portion of the device were positioned on a vehicle so that the display is facing a side of the roadway.

Digital displays that employ Arabic numerals may be very difficult to read and interpret on a moving vehicle. What would be easier for a person to see is an array of individual lights where each light represents one unit of time, such as one hour. In this respect, it would be desirable if a driver safety parameter display apparatus employed a visual display which employs an array of individual lights, each of which represents one hour of driving time.

Presently, rules for truck drivers provide that after a truck driver drives ten hours, the driver is required to refrain from driving for hours. In this respect, it would be desirable if a driver safety parameter display apparatus had ten indicator lights, one for each hour, to indicate when ten hours of driving has taken place.

Moreover, to help assure that the driver does not begin to drive again until an eight hour rest period has been completed, it would be desirable if a driver safety parameter display apparatus provided that the ten individual hour indicator lights could not be de-activated until a timed eight hour rest period has intervened.

Because of economic and other pressures, there are tendencies for truck drivers to make efforts to drive longer than ten hours and to rest less than eight hours. As a result, there may be a temptation for a driver to tamper with a time keeping device so that accurate time keeping is prevented. In this respect, it would be desirable if a driver safety parameter display apparatus includes a tamper-avoiding feature which gives a clear signal that tampering has occurred.

Aside from lime parameters relating to driver safety, other safety parameters may also be important. An accurate record of top speed may also be important. In addition, an accurate record of mileage accumulated during a ten hour run may also be of importance. In this respect, it would be desirable if a driver safety parameter display apparatus recorded and displayed top speed and mileage accumulated during a ten hour run.

Thus, while the foregoing body of prior art indicates it to be well known to use driver safety parameter display devices, the prior art described above does not teach or suggest a driver safety parameter display apparatus which has the following combination of desirable features: (1) can be visually monitored on a moving vehicle and can be monitored without having the vehicle stop to be checked; (2) automatically and electronically records appropriate driving safety parameters without having a driver manually enter the driving data; (3) has a display portion of the apparatus positioned on a vehicle so that the display is facing a selected side of the roadway; (4) employs a visual display which employs an array of individual lights, each of which represents one hour of driving time; (5) has ten indicator lights, one for each hour, to indicate when ten hours of driving has taken place; (6) provides that the ten individual hour indicator lights cannot be disabled until a timed eight hour rest period has intervened; (7) includes a tamper-avoiding feature which gives a clear signal that tampering has occurred; and (8) records and displays top speed and mileage accumulated during a ten hour run. The foregoing desired characteristics are provided by the unique driver safety parameter display apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a driver safety parameter display apparatus for a motor vehicle. The driver safety parameter display apparatus includes a housing assembly and a timer assembly housed within the housing assembly for recording time data for time of operation of the motor vehicle. A computer processor assembly is housed within the housing assembly and is electrically connected to the timer assembly for receiving time data signals from the timer assembly. An array of individual illumination assemblies is supported by the housing assembly and is visible from outside the housing assembly. The illumination assemblies are electrically connected to the computer processor assembly for indicating sequentially and cumulatively an accumulation of time of operation of the motor vehicle. A connector assembly is provided for mechanically connecting the housing assembly to an outside surface of the motor vehicle.

The array of illumination assemblies includes nine illumination assemblies arranged in a matrix of three rows and three columns. The array of illumination assemblies includes a tenth illumination assembly placed aside the matrix of illumination assemblies. The matrix of nine illumination assemblies indicates a sequence of one to nine driving hours, and the tenth illumination assembly indicates a tenth driving hour.

A maximum speed indicator assembly includes electrical conductors connected to a speedometer which provides an electrical speed signal. The electrical conductors are also connected to the computer processor assembly which processes electrical speed signals received through the electrical conductors. A digital speed display module is electrically connected to the computer processor assembly for displaying a maximum speed obtained by the speedometer.

A cumulative mileage indicator assembly includes electrical conductors connected to an odometer which provides an electrical cumulative mileage signal. The electrical conductors are also connected to the computer processor assembly for processing electrical cumulative mileage signals received through the electrical conductors. A digital cumulative distance display module is electrically connected to the computer processor assembly for displaying a cumulative mileage obtained by the odometer.

A tamper indication assembly is provided which includes a switch assembly actuated by displacement of the housing assembly. Electrical conductors are connected between the switch assembly and the computer processor assembly. A tamper indication display module is electrically connected to the computer processor assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved driver safety parameter display apparatus which has all of the advantages of the prior art and none of the disadvantages.

It is another object of the present invention to provide a new and improved driver safety parameter display apparatus which may be easily and efficiently manufactured and marketed.

It is a further object of the present invention to provide a new and improved driver safety parameter display apparatus which is of durable and reliable construction.

An even further object of the present invention is to provide a new and improved driver safety parameter display apparatus which is susceptible of a low cost of manufacture with regard to both materials and labor, and which accordingly is then susceptible of low prices of sale to the consuming public, thereby making such driver safety parameter display apparatus available to the buying public.

Still yet a further object of the present invention is to provide a new and improved driver safety parameter display apparatus which can be visually monitored on a moving vehicle and can be monitored without having the vehicle stop to be checked.

Still another object of the present invention is to provide a new and improved driver safety parameter display apparatus that automatically and electronically records appropriate driving safety parameters without having a driver manually enter the driving data.

Yet another object of the present invention is to provide a new and improved driver safety parameter display apparatus which has a display portion of the apparatus positioned on a vehicle so that the display is facing a selected side of the roadway.

Even another object of the present invention is to provide a new and improved driver safety parameter display apparatus that employs a visual display which employs an array of individual lights, each of which represents one hour of driving time.

Still a further object of the present invention is to provide a new and improved driver safety parameter display apparatus which has ten indicator lights, one for each hour, to indicate when ten hours of driving has taken place.

Yet another object of the present invention is to provide a new and improved driver safety parameter display apparatus that provides that the ten individual hour indicator lights cannot be disabled until a timed eight hour rest period has intervened.

Still another object of the present invention is to provide a new and improved driver safety parameter display apparatus which includes a tamper-avoiding feature which gives a clear signal that tampering has Yet another object of the present invention is to provide a new and improved driver safety parameter display apparatus that records and displays top speed and mileage accumulated during a ten hour run.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the driver safety parameter display apparatus of the invention permanently attached to a portion of the driver side of a truck.

FIG. 2 is an enlarged front view of the embodiment of the invention shown in FIG. 1.

DESCRIPTION OF THE PREFERRED EMBODIMENT

With reference to the drawings, a new and improved driver safety parameter display apparatus embodying the principles and concepts of the present invention will be described.

Figure 3:
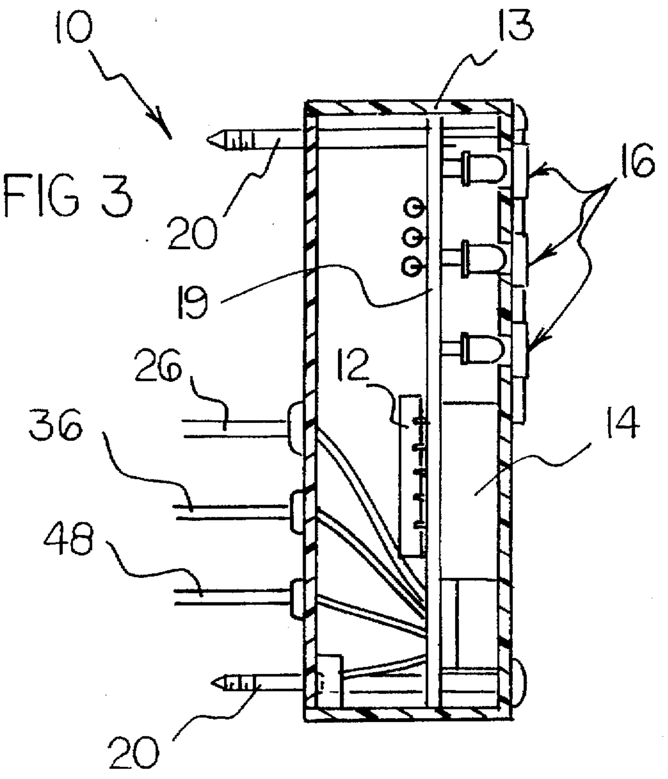
FIG. 3 is a cross-sectional view of the embodiment of the driver safety parameter display apparatus of FIG. 2 taken along line 3—3 thereof.
Figure 4:
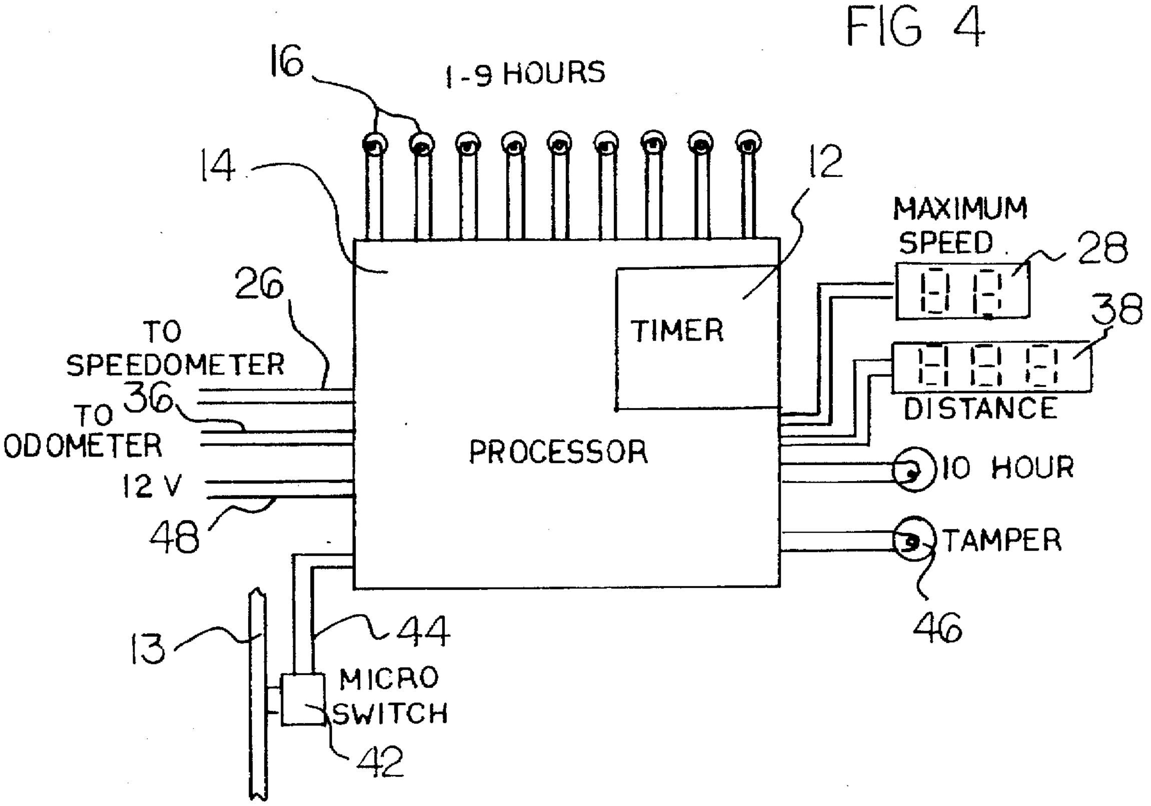
FIG. 4 is a block circuit diagram of the major electronic sub-systems in the driver safety parameter display apparatus of the invention.

Turning to FIGS. 1–4, there is shown an exemplary embodiment of the driver safety parameter display apparatus of the invention generally designated by reference numeral 10. In its preferred form, driver safety parameter display apparatus 10 is provided for a motor vehicle 11 and includes a housing assembly 13 and a timer assembly 12 housed within the housing assembly 13 for recording time data for time of operation of the motor vehicle 11. A computer processor assembly 14 is housed within the housing assembly 13 and is electrically connected to the timer assembly 12 for receiving time data signals from the timer assembly 12. An array of individual illumination assemblies 16 is supported by the housing assembly 13 and is visible from outside the housing assembly 13. The illumination assemblies 16 are electrically connected to the computer processor assembly 14 for indicating sequentially and cumulatively an accumulation of time of operation of the motor vehicle 11. A connector assembly is provided for mechanically connecting the housing assembly 13 to an outside surface of the motor vehicle 11. The connector assembly may be in the form of a plurality of screws 20 or bolts that are used to mechanically connect the housing assembly 13 to a hood panel 22 of the truck 11 shown in FIG. 1. When bolts are used, nuts are also used.

The array of illumination assemblies 16 includes nine illumination assemblies 16 arranged in a matrix of three rows and three columns. The array of illumination assemblies 16 includes a tenth illumination assembly 17 placed aside the matrix of illumination assemblies 16. The matrix of nine illumination assemblies 16 indicates a sequence of one to nine driving hours, and the tenth illumination assembly 17 indicates a tenth driving hour.

A maximum speed indicator assembly includes electrical conductors 26 connected to a speedometer which provides an electrical speed signal. The electrical conductors 26 are also connected to the computer processor assembly 14 which processes electrical speed signals received through the electrical conductors 26. A digital speed display module 28 is electrically connected to the computer processor assembly 14 for displaying a maximum speed obtained by the speedometer.

A cumulative mileage indicator assembly includes electrical conductors 36 connected to an odometer which provides an electrical cumulative mileage signal. The electrical conductors 36 are also connected to the computer processor assembly 14 for processing electrical cumulative mileage signals received through the electrical conductors 36. A digital cumulative distance display module 38 is electrically connected to the computer processor assembly 14 for displaying a cumulative mileage obtained by the odometer.

A tamper indication assembly is provided which includes a switch assembly 42 actuated by displacement of the housing assembly 13. Electrical conductors 44 are connected between the switch assembly 42 and the computer processor assembly 14. A tamper indication display module 46 is electrically connected to the computer processor assembly 14.

All of the electrical components can be powered by power in electrical conductors 48 from the battery of the motor vehicle 11 which may be a 12 volt battery.

In using the driver safety parameter display apparatus 10 of the invention, the reset button 50 is pressed to initialize the apparatus. As the motor vehicle 11 is driven, the length of time of driving is kept by the timer assembly 12 and is processed by the computer processor assembly 14. The computer processor assembly 14 drives the matrix of nine illumination assemblies 16 in a sequential way for each hour of time recorded. One desirable sequence of illumination is to have the first row of illumination assemblies 16 lit in sequence from left to right, followed by the second row of illumination assemblies 16 lit in sequence from left to right, followed by the third row of illumination assemblies 16 lit in sequence from let to right. When each additional hour of running time is logged, an additional illumination assembly 16 is lit, and all of the previously lit illumination assemblies 16 remain lit. For example, after five hours of vehicle running, five illumination assemblies 16 will be lit. After nine hours of running, nine illumination assemblies 16 will be lit. When the tenth hour of running has been completed, the tenth illumination assembly 17 will also light.

Each of the nine illumination assemblies 16 and the tenth illumination assembly 17 are visible by a person, such as a law enforcement officer, stationed by a side of a roadway on which the motor vehicle 11 travels. Thus, the number of hours that the motor vehicle 11 has run is visible to a law enforcement official without stopping the vehicle 11 and checking devices retained in the passenger compartment of the vehicle 11. Since a fully lit matrix of nine illumination assemblies 16 is very visible, and since the tenth illumination assembly 17 is the largest of the illumination assemblies and is ever more visible, a law enforcement person can very clearly observe that ten hours of driving have taken place. Therefore, the law enforcement officer can clearly understand that the vehicle is in violation of the law without first stopping the vehicle.

Normally, the tamper indication display module 46 is illuminated. If the driver safety parameter display apparatus 10 is tampered with, the mechanical contact of the housing assembly 13 on the switch assembly 42 is disrupted, and the tamper indication display module 46 will be turned off by the computer processor assembly 14. This will signal that the driver safety parameter display apparatus 10 has been tampered with. Alternatively, when tampering occurs, the computer processor assembly 14 can light the matrix of illumination assemblies 16 and the tenth illumination assembly 17 to signal that the driver has exceeded the allowable drawing time.

The computer processor assembly 14 is preferably a programmable microprocessor which can be programmed to provide that the tamper indication display module 46 can serve an additional function. The computer processor assembly 14 can turn the tamper indication display module 46 off and keep it off for a predetermined recovery period, such as eight hours. Unless a recovery period of eight hours transpires, the matrix of nine illumination assemblies 16 and the tenth illumination assembly 17 will indicate that tampering has taken place. They can be controlled to all turn on if the vehicle is operated before the predetermined recovery period transpires. Only after the recovery period has transpired, will the tamper indication display module 46, the matrix of nine illumination assemblies 16, and the tenth illumination assembly 17 operate in the normal way.

The reset button 50 is also used to reset the digital speed display module 28 and the digital cumulative distance display module 38. The circuit components contained within the housing assembly 13 can be supported on a circuit board 19. As stated above, the computer processor assembly 14 can be a programmable microprocessor as is well known in the art. The computer processor assembly 14 can be programmed to handle all of the inputs and outputs described above. More teachings of related circuitry that can be used in part with the driver safety parameter display apparatus 10 of the invention are disclosed in a number of U.S. patents discussed hereinabove. More specifically, U.S. Pat. Nos. 4,338,512, 4,608,638, 4,612,655, 5,046,007, and 5,253,224 are incorporated herein by reference for their disclosure of electronic circuitry and sub-systems relating to recording data relating to time spent driving motor vehicles.

The components of the driver safety parameter display apparatus of the invention can be made from inexpensive and durable metal and plastic materials as well as conventional electronic components and sub-systems.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved driver safety parameter display apparatus that is low in cost, relatively simple in design and operation, and which may advantageously be used to be visually monitored on a moving vehicle and can be monitored without having the vehicle stop to be checked. With the invention, a driver safety parameter display apparatus is provided which automatically and electronically records appropriate driving safety parameters without having a driver manually enter the driving data. With the invention, a driver safety parameter display apparatus is provided which has a display portion of the apparatus positioned on a vehicle so that the display is facing a selected side of the roadway. With the invention, a driver safety parameter display apparatus is provided which employs a visual display which employs an array of individual lights, each of which represents one hour of driving time. With the invention, a driver safety parameter display apparatus is provided which has ten indicator lights, one for each hour, to indicate when ten hours of driving has taken place. With the invention, a driver safety parameter display apparatus provides that the ten individual hour indicator lights cannot be disabled until a timed eight hour rest period has intervened. With the invention, a driver safety parameter display apparatus is provided which includes a tamper-avoiding feature which gives a clear signal that tampering has occurred. With the invention, a driver safety parameter display apparatus is provided which records and displays top speed and mileage accumulated during a ten hour run.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A driver safety parameter display apparatus for a motor vehicle, comprising:

a housing assembly, a timer assembly, housed within said housing assembly, for recording time data for time of operation of the motor vehicle, a computer processor assembly, housed within said housing assembly and electrically connected to said timer assembly, for receiving time data signals from said timer assembly, an array of individual illumination assemblies, supported by said housing assembly and visible from outside said housing assembly, wherein said illumination assemblies are electrically connected to said computer processor assembly for indicating sequentially and cumulatively an accumulation of time of operation of the motor vehicle, and a connector assembly for mechanically connecting said housing assembly to an outside surface of the motor vehicle, wherein said array of illumination assemblies includes nine illumination assemblies arranged in a matrix of three rows and three columns.

2. The apparatus of claim 1 wherein said array of illumination assemblies includes a tenth illumination assembly placed aside said matrix of illumination assemblies.

3. The apparatus of claim 2 wherein:

said matrix of nine illumination assemblies indicate a sequence of one to nine driving hours, and said tenth illumination assembly indicates a tenth driving hour.

4. The apparatus of claim 1, further including a maximum speed indicator assembly which includes:

electrical conductors connected to a speedometer which provides an electrical speed signal and connected to said computer processor assembly, said computer processor assembly for processing electrical speed signals received through said electrical conductors, and a digital speed display module electrically connected to said computer processor assembly for displaying a maximum speed obtained by the speedometer.

5. The apparatus of claim 1 further including a cumulative mileage indicator assembly which includes:

electrical conductors connected to an odometer which provides an electrical cumulative mileage signal and connected to said computer processor assembly, said computer processor assembly for processing electrical cumulative mileage signals received through said electrical conductors, and a digital cumulative distance display module electrically connected to said computer processor assembly for displaying a cumulative mileage obtained by the odometer.

6. The apparatus of claim 1 further including a tamper indication assembly which includes:

a switch assembly actuated by displacement of said housing assembly, electrical conductors connected between said switch assembly and said computer processor assembly, and a tamper indication display module electrically connected to said computer processor assembly.

* * * * *